(No Model.)
J. W. McCALL.
PLANT PROTECTOR.
No. 382,370.  Patented May 8, 1888.
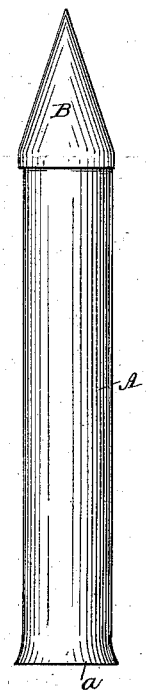
Fig. 1.
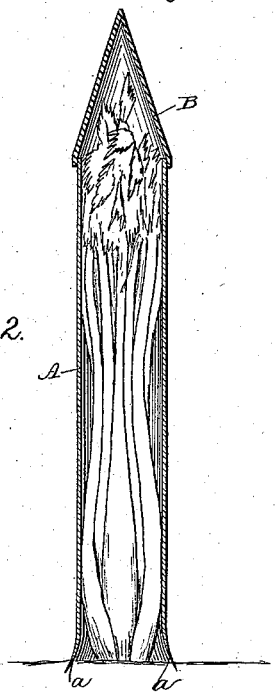
Fig. 2.
Fig. 3.
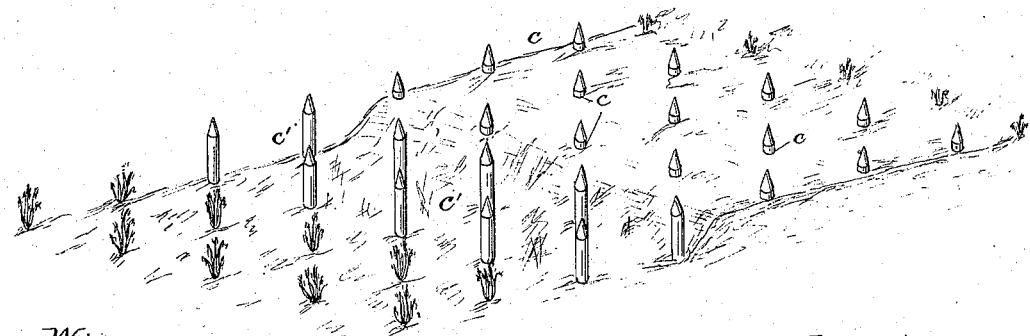
Witnesses:
E. D. Smith.
J. L. Barker.
Inventor:
Joseph W. McCall.

UNITED STATES PATENT OFFICE.

JOSEPH W. McCALL, OF KANSAS CITY, MISSOURI.

PLANT-PROTECTOR.

SPECIFICATION forming part of Letters Patent No. 382,370, dated May 8, 1888.

Application filed May 24, 1886. Serial No. 203,138. (No model.)

*To all whom it may concern:*

Be it known that I, JOSEPH W. McCALL, a citizen of the United States, residing at Kansas City, in the county of Jackson and State of Missouri, have invented certain new and useful Improvements in Plant-Protectors, of which the following is a specification, reference being had therein to the accompanying drawings.

Figure 1 is a side elevation of a celery shield or protector embodying my invention. Fig. 2 is a vertical section showing the celery shield or protector placed over a celery-plant. Fig. 3 shows the method of using my invention.

In the drawings, A represents the body portion of the shield or protector, which is by preference cylindrical in form and slightly flaring at its lower end, for a purpose to be described. It may be made from any desired material provided it be sufficiently rigid or stiff enough to resist the outward pressure of the stems of the celery, and to resist the inward pressure of the earth when the latter is packed about the shield; and on account of cheapness and durability I prefer to construct it from tin.

Heretofore it has been a matter of considerable difficulty and labor when it became necessary to fill or bank up around the celery-plants, as is customary in the cultivation of this plant, to remove all objectionable and superfluous stems and suckers, to so hold the stems that they shall be in a compact mass, and to prevent the earth or other foreign matter from coming in contact with the central portion or heart of the plant, which would die were dirt allowed to remain upon or in contact therewith, or to prevent dirt from falling in between and thus discoloring and marring the stems. By the use of my invention, however, these difficulties are overcome. When it becomes necessary to fill up around the plants, the shield or protectors—one for each plant—are placed over them, as shown in Fig. 3, the flared lower open ends of the tubes enabling them to be easily slipped over the plants, the stems of which are compressed and closely held together in straight compact masses as they pass into the tube portions A of the protectors. It will be understood that if the lower end be flared, as described, it should not be so formed as to interfere with readily drawing the protector from the ground. The dead leaves, suckers, and other objectionable stems, which have heretofore been removed by hand, are severed from the stalk by the protector as its lower edge comes in contact with the ground, it being sharpened for that purpose, as at *a*. After the bed has been filled up to the proper height, as at *c*, Fig. 3, the protectors are withdrawn and used to cover the plants in the part *c'* of the bed, the protectors being thus used over and over again, and requiring the use of but a comparatively small number, even though the bed be large.

In order to prevent earth from falling into the tube A and working down between the stems and into contact with the heart of the plant, I prefer to provide the cylinder or tube A with a cap or cover, B. The form of cap or cover which I have shown and prefer to use is conical and formed integrally with or attached directly to the upper end of the tube; but I do not wish to be limited to any particular form of cover so long as it prevents the entrance of objectionable material into the tube during the time it is in use over a plant.

The protectors should not only be of such internal diameter as to compact the stems into a comparatively-tight mass, but the wall of the protector should also be thin, so that when removed there shall be but little opportunity for the stems to spread.

I do not wish to be limited to the use of my invention in the cultivation of celery only, although, as I have described, it is particularly adapted therefor.

What I claim is—

A celery-shield having a tubular body portion, A, of an interior diameter approximating the desired diameter of the mass of plant-stems over which it is to be placed, and having its lower edge flaring and sharpened, as at *a*, substantially as and for the purposes set forth.

In testimony whereof I affix my signature in presence of two witnesses.

JOSEPH W. McCALL.

Witnesses:
H. C. BROOKING,
W. J. BALES.